United States Patent [19]

Suzuki et al.

[11] 4,400,771

[45] Aug. 23, 1983

[54] MULTI-PROCESSOR SYSTEM WITH PROGRAMMABLE MEMORY-ACCESS PRIORITY CONTROL

[75] Inventors: Seigo Suzuki, Yokohama; Seiji Eguchi, Kawasaki, both of Japan

[73] Assignee: Tokyo Shibaura Electric Co., Ltd., Tokyo, Japan

[21] Appl. No.: 209,216

[22] Filed: Nov. 21, 1980

Related U.S. Application Data

[63] Continuation-in-part of Ser. No. 45,656, Jun. 5, 1979, abandoned, which is a continuation of Ser. No. 747,974, Dec. 6, 1976, abandoned.

[30] Foreign Application Priority Data

Dec. 4, 1975 [JP] Japan .............................. 50-144631
Dec. 4, 1975 [JP] Japan .............................. 50-144632

[51] Int. Cl.³ ..................... G06F 15/16; G06F 15/18
[52] U.S. Cl. .................................................. 364/200
[58] Field of Search ....................... 364/200 MS File

[56] References Cited

U.S. PATENT DOCUMENTS

| | | | |
|---|---|---|---|
| 3,676,861 | 6/1972 | Ruth ................................... | 364/200 |
| 3,696,860 | 6/1972 | Collier et al. ....................... | 364/200 |
| 4,075,691 | 2/1978 | Davis et al. ........................ | 364/200 |
| 4,096,571 | 6/1978 | Vander Mey ........................ | 364/200 |
| 4,096,572 | 6/1978 | Namimoto .......................... | 364/200 |
| 4,151,592 | 4/1979 | Suzuki ................................ | 364/200 |

OTHER PUBLICATIONS

*Programmable Priority Mechanism,* Christensen, IBM TDB vol. 17, No. 7, Dec. 1974.

*Primary Examiner*—Harvey E. Springborn
*Attorney, Agent, or Firm*—Oblon, Fisher, Spivak, McClelland & Maier

[57] ABSTRACT

A multi-processor system includes a plurality of processors, a common shared memory, and programmable memory access priority control circuit. The programmable memory access priority control circuits includes a programmable register circuit and a priority control circuit. The programmable register circuit stores priority information designating a memory access grade priority for each of the processors, wherein the priority information is changeable either manually, by external circuit or by at least one of the processors and remains fixed irrespective of access of the memory by any of the processors until being changed. The register circuit outputs priority information signals which indicate the memory access grade priority of each of the processors. The priority control circuit receives the priority information signals from the register means, receives a memory request signal from the processors requesting memory access (i.e. use) of the common shared memory, and outputs an acknowledge signal enabling the processor having the highest memory access grade priority to use the common shared memory in accordance with the priority information.

9 Claims, 14 Drawing Figures

FIG. 5B $P_1, P_2, P_D$ : PRIORITY INFORMATION SIGNALS
$MRQ_1, MRQ_2, MRQ_D$ : MEMORY REQUEST SIGNALS
1stDPC, 2ndDPC, 3rdDPC : GRADE PRIORITY SELECT DETECTING SIGNALS
$DPR_1, DPR_2, DPR_D$ : PROCESSOR INDICATING SIGNALS
$ACK_1, ACK_2, ACK_D$ : ACKNOWLEDGE SIGNALS
1stPC, 2ndPC, 3rdPC : MEMORY REQUEST DETECTING SIGNALS

MULTI-PROCESSOR SYSTEM WITH PROGRAMMABLE MEMORY-ACCESS PRIORITY CONTROL

CROSS-REFERENCE TO RELATED APPLICATIONS

This application is a continuation-in-part of U.S. application Ser. No. 045,656 filed June 5, 1979, now abandoned, which is a continuation of U.S. application Ser. No. 747,974 filed Dec. 6, 1976 and now abandoned.

BACKGROUND OF THE INVENTION

1. Field of the Invention

This invention generally relates to a multi-processor system and more particularly to a multi-processor system with programmable memory-access priority control means.

2. Description of the Prior Art

In a multi-processor system, it is very important that a common shared memory or a common bus connected with processors is effectively used.

In the conventional multi-processor system, the memory access operation was generally conducted in response to the priority assigned to each processor under the control of fixed hardware.

Figure 1:
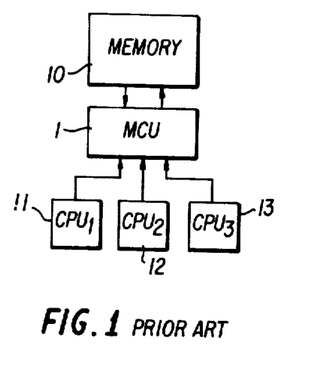
FIG. 1 is a schematic block diagram of a conventional multi-processor system.

The prior art multi-processor system shown in FIG. 1, for example, includes hardware logic circuits in a memory control unit 1 (MCU) to determine the priority of memory-access operation to memory 10 in accordance with requests from processors 11 ($CPU_1$), 12 ($CPU_2$) and 13 ($CPU_3$).

This system has a simple hardware configuration, however, the priority of the processors is fixed by the logic circuits, so that the following inconveniences exist.

Thus, for example, even if processor 11 ($CPU_1$) executes a dummy loop which is not of an urgent nature and processor 12 ($CPU_2$) executes a routine which is of a very high degree of urgency and is caused by a request from a direct memory access controller (not shown), then under the superior fixed priority of processor 11 ($CPU_1$) to processor 12 ($CPU_2$), the processor 12 ($CPU_2$) must always wait for the completion of the memory operation by processor 11 ($CPU_1$). Also, while the dynamic programming in the multi-processor system coordinates each processor so that the efficiency of the system may be improved and the priority of jobs executed by the processors are varied from one moment to the next, the priority of the memory access operation should be designed so as to meet the demands of each need.

Alternatively, a specified supervisory control program may be adopted to assign different programs to a respective processor for execution. But once again, priority of access of a common shared memory by the processors is fixed by the hardware.

SUMMARY OF THE INVENTION

Accordingly, it is an object of the present invention to provide a new and improved multi-processor system of high efficiency.

It is another object of the present invention to provide a new and improved multi-processor system with programmable memory access priority control means which is capable of high efficiency priority selecting of a plurality of processors.

The foregoing and other objects of the invention are attained by providing a multi-processor system which comprises (a) a plurality of processors; (b) a common shared memory for being used by the processors; (c) a bus connected to the processors and the memory, for transferring data from one of the processors to the memory or from the memory to one of the processors; (d) a register circuit for storing a priority information designating a memory access grade priority for each of the processors, wherein the priority information is changeable by at least one of the processors and remains fixed irrespective of access of the memory by any of the processors until being changed by the at least one processor, and wherein the register circuit outputs priority information signals which indicate the memory access grade priority of each of the processors; and a (e) priority control circuit for receiving the priority information signals from the register circuit, for receiving a memory request signal from an access requesting processor when the access requesting processor requests the right to access the memory, and for outputting an acknowledge signal enabling the access requesting processor having the highest memory access grade priority to use the memory in accordance with the priority information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
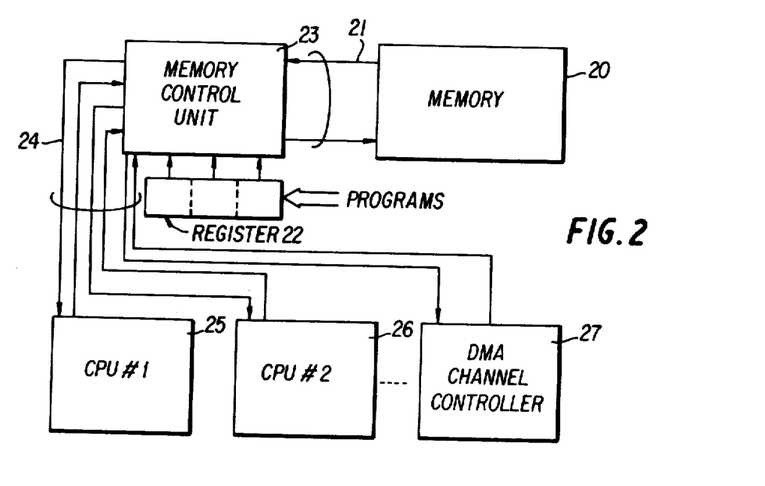
FIG. 2 is a schematic block diagram of a basic conception of one embodiment of this invention.

Referring now to the drawings, wherein like numerals designate or refer to corresponding parts throughout the several views and more particularly to FIG. 2 thereof, a basic conception of a multi-processor system of this invention is shown as including a common shared memory 20, a common memory bus 21, a programmable register 22, a memory control unit 23, control lines 24 and a plurality of processors (i.e. central processor units 25, 26 and a direct memory access channel controller 27).

The memory 20 and the memory bus 21 are commonly utilized by the processors 25, 26 and 27. The programmable register 22 stores priority information corresponding to memory access priority of respective of the processors 25, 26 and 27; and the contents of the priority information may be changed in accordance with programs which are provided through the processors 25, 26 and 27.

The memory control unit 23 distinguishes the priority of the memory access requests from the processors 25, 26 and 27 in response to the contents of the register 22 and then grants the right of use of the memory bus 21 and the memory 23 to an appropriate one of the processors 25, 26 and 27.

The operation of the right use to the memory 20 is as follows:

(1) Processor 25, for example, sends a memory request (MRQ="1") signal to the memory control unit 23 through the control lines 24.

(2) After comparing the contents of the register 22 with the MRQ signal, the memory control unit 23 determines or not to give the right to use of the memory 20 to the processor 25.

(3) When the processor 25 is allowed to use the memory 20, the memory control unit 23 sends back an acknowledge (ACK=1) signal to the processor 25.

(4) After receiving the ACK signal, the processor 25 transfers data to or from the memory 20 through the memory bus 21. The timing of the data-transfer is controlled by the memory control unit 23.

The processor 25 informs the memory control unit 23 of the completion of use of the memory 20 by means of a MRQ (MRQ="0") signal. The memory control unit 23 in this system may grant the right of use of the memory 20 to one of the central processing units 25 and 26 or the channel controller 27 which sends the MRQ signal earliest to the memory control unit 23 if the memory access requests from the central processing units 25 and 26 and/or the channel controller 27 are under the condition of equivalent priority.

Further, it should be understood that when MRQ signals are received concurrently, the hardware in the memory control unit 23 may fix the priority in a predetermined order.

Accordingly, jobs given to the processors 25, 26 and 27 may be fulfilled under the highest efficiency conditions of the system, because the contents of the register 22 are easily changed in accordance with programs when a change of the priority is demanded.

With respect to the software, the complexity thereof may be reduced because it is necessary to merely set the priority information in the register 22.

Figure 3:
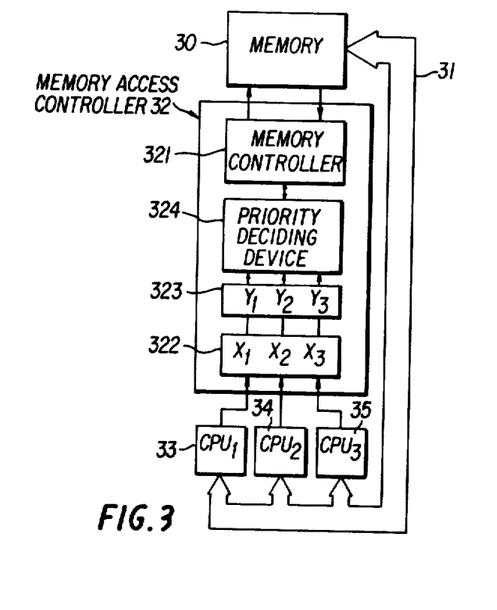
FIG. 3 is a schematic block diagram of a basic conception of another embodiment of the present invention.

A basic conception of another embodiment of the multi-processor system of the present invention is shown in FIG. 3. This system includes a common shared memory 30, a memory bus 31, a memory access controller 32 and a plurality of processors 33 (CPU$_1$) 34 (CPU$_2$) and 35 (CPU$_3$).

The memory 30 is commonly connected to the processors 33, 34 and 35 through the memory bus 31. The memory access controller 32 includes a memory controller 321, a programmable register 322, a programmable mask register 323 and a priority deciding device 324.

The memory controller 321 in this system controls the read/write operations of the memory 30.

The contents of the programmable register 322 include three bits of information X1, X2 and X3, which are changed to set the priority of the processors 33, 34 and 35 in accordance with programs supplied through the processors 33, 34 and 35.

The priority deciding device 324 will finally decide the right of a memory access request from the processors 33, 34 and 35.

The operation of this system will be explained hereinafter. Assume that the contents of the register 322 are set, for example, as X1=3, X2=2 and X3=1 as shown in FIG. 4(a) by the supervisory program or programs being executed in the processors 33, 34 and 35.

Since the memory 30 includes only a limited memory area, the results of operations executed by the processors 33, 34 and 35 are stored as data in a specified area of the memory 30.

Figure 4A:
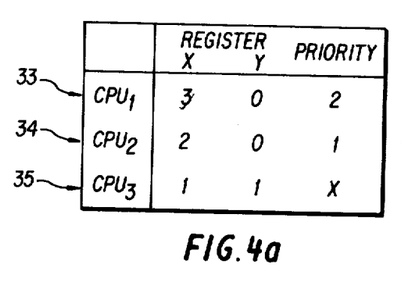
FIGS. 4(a) and 4(b) are charts illustrating priority determination in accordance with the embodiment of FIG. 3.

If it is preferred that the data, as a result of the operation executed by the processor 33, for example, are to be kept from destruction by the next access of the processor 35, access of the memory area is inhibited from the processor 35 by setting flag "1" of Y3 as shown in FIG. 4(a) where Y1=Y2=0.

When the processors 33, 34 and 35 concurrently request to transfer data from or to the memory 30 through the memory bus 31, only the requests from the processors 33 and 34 are processed by the priority deciding device 324 in spite of the highest degree (grade) of priority of request from the processor 35, because the request from the processor 35 is masked in the register 323.

After comparing the grade of the priority of the processor 33 with that of the processor 34, the priority deciding device 324 grants the right of memory access operation to the processor 34.

Figure 4B:
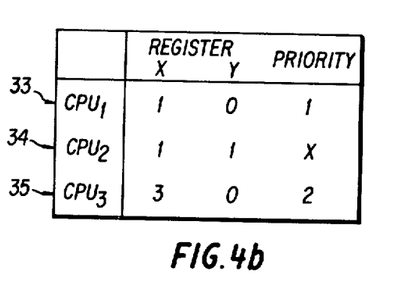

In the case shown in FIG. 4(b), the processor 33 is granted the right of use of the memory 30, because the request from the processor 34 is masked in the register 333.

It should now be apparent that according to this system, the right of memory access operation is granted so that the efficiency of the use of memory 30 may be greatly improved over heretofore existing systems.

In addition it should now be apparent that with the present embodiment, since the necessary data in the memory 30 are protected by the programmable mask register 323, the handling of interrupts is executed without the burden of programmers and, thus, the efficiency of the multi-processor system is greatly improved.

Now there will be described in more detail by reference to FIGS. 5A–5D multi-processor system with programmable memory access priority control according to a typical embodiment of this invention corresponding to the above basic conception of FIG. 2.

The multi-processor system includes a plurality of processors (processing means) 51, 52 and 53, a common shared memory 54, and programmable memory access priority control means 55.

The processors are the first central processing unit (CPU#1) 51, the second central processing unit (CPU#2) 52, and a direct memory access channel controller (DMAC) 53. The processors 51, 52 and 53 and the memory 54 are connected to a common bus 56. The processors 51 and 52 transfer data from or to the memory 54 through the bus 56 respectively. That is, the memory 54 is commonly used by the processors 51 and 52. The direct memory access channel controler 53 controls the memory 54 so that the memory 54 may directly transfer data from or to another memory or I/O devices (not shown in FIGS. 5A-5D). It is not always necessary to use a direct memory access channel controller in this invention; however, the direct memory channel controller can be used as one of the processors in this invention. The processors 51, 52 and 53 output memory request signals $MRQ_1$, $MRQ_2$ and $MRQ_D$, respectively, when they want to use the memory 54. The processors 51, 52 and 53 receives acknowledge signals $ACK_1$, $ACK_2$ and $ACK_D$ if permitted to use the memory 54. Generally, a central processing unit is known as a CPU, and a direct memory access channel controller is also known, for example as shown in U.S. Pat. No. 4,075,691. A common shared memory is also usually known. Therefore detailed description thereof is omitted.

The programmable memory access priority control circuit 55 is the most important feature in this invention. This means 55 includes programmable register circuit 57 and priority control circuit 58.

The programmable register means 57 stores priority information, which corresponds to memory access priority of each of the processors 51, 52 and 53. The register circuit 57 has six flip-flops 571, 572, 573, 574, 575 and 576. The priority of the first central processing unit 51 is stored in the flip-flops 571 and 572. The priority of the second central processing unit 52 is stored in the flip-flops 573 and 574. The priority of the direct memory access channel controller 53 is stored in the flip-flops 575 and 576. The contents of the register circuit 57, that is to say, the priority information can be changed to set the priority of the processors 51, 52 and 53 in accordance with programs supplied through the processors 51, 52 and 53. For example, processor priority may be programmed as a function of the time of day, or some other predetermined criteria such that processor priority is automatically changed based thereon. This can be done conventionally by decoding an address assigned to the register circuit 57 from the bus 56 and then latching priority information also provided on the bus 56 from one of the processors 51–53 into the register circuit 57. Alternatively priority information can be manually set in the register circuit 57. The contents of the register circuit 57 are outputted from the flip-flops 571, 572, 573, 574, 575 and 576 to the priority control means 58 as priority information signals $P_1$, $P_2$ and $P_D$. The priority information signal $P_1$ includes a signal $P_{11}$ and a signal $P_{12}$. The priority information signal $P_2$ includes a signal $P_{21}$ and a signal $P_{22}$. The priority information signal $P_D$ includes a signal $P_{D1}$ and a signal $P_{D2}$.

The priority control circuit 58 of this embodiment includes a memory request detecting circuit 581, a grade priority selecting circuit 582, a selected grade priority-corresponding processor converting circuit 583, and an acknowledge signal generating circuit 584.

The memory request detecting circuit 581 is used to detect whether each grade priority is being requested or not. The memory request detecting circuit 581, for example, includes nine AND GATEs 5811–5819, six inverters 5820–5825, and three OR GATEs 5826–5828 as shown in FIG. 5.

The AND GATE 5811 receives the priority information signal $P_1$ (i.e. the signals $P_{11}$ and $P_{12}$) and the signal $MRQ_1$. The AND GATE 5812 receives the priority information signal $P_2$ (i.e. the signals $P_{21}$ and $P_{22}$) and the signal $MRQ_2$. The AND GATE 5813 receives the priority information signal $P_D$ (i.e. the signals $P_{D1}$ and $P_{D2}$) and the signal $MRQ_D$. The OR GATE 5826 receives the output signals from the AND GATEs 5811–5813.

The AND GATE 5814 receives the signal $P_{11}$ directly, the signal $P_{12}$ through the inverter 5820, and the signal $MRQ_1$. The AND GATE 5815 receives the signal $P_{21}$ directly, the signal $P_{22}$ through the inverter 5821, and the signal $MRQ_2$. The AND GATE 5816 receives the signal $P_{D1}$ directly, the signal $P_{D2}$ through the inverter 5822, and the signal $MRQ_D$. The OR GATE 5827 receives the output signals from the AND GATEs 5814–5816.

The AND GATE 5817 receives the signal $P_{11}$ through the inverter 5823, the signal $P_{12}$ directly, and the signal $MRQ_1$. The AND GATE 5818 receives the signal $P_{21}$ through the inverter 5824, the signal $P_{22}$ directly, and the signal $MRQ_2$. The AND GATE 5819 receives the signal $P_{D1}$ through the inverter 5825, the signal $P_{D2}$ directly, and the signal $MRQ_D$. The OR GATE 5828 receives the output signals from the AND GATEs 5817–5819.

The OR GATEs 5826–5827 output memory request detecting signals 1st PC, 2nd PC and 3rd PC, respectively.

The memory request detecting signal 1st PC indicates whether the first grade priority is being requested or not. The memory request detecting signal 2nd PC indicates whether the second grade priority is being requested or not. The memory request detecting signal 3rd PC indicates whether the third grade priority is being requested or not.

These memory request detecting signals 1st PC, 2nd PC and 3rd PC are outputted to the grade priority selecting circuit 582. The grade priority selecting circuit 582 is used to select the highest detected grade priority among the grade priorities being requested in the memory request detecting circuit 581.

The grade priority selecting circuit 582, for example, includes two inverters 58201 and 58202 and two AND GATEs 58203 and 58204 as shown in FIG. 5. The AND GATE 58203 and 58204 as shown in FIG. 5. The AND GATE 58203 receives the signal 1st PC through the inverter 58201, and the signal 2nd PC directly. The AND GATE 58204 receives an output signal of the AND GATE 58203 through the inverter 58202, the signal 1st PC through the inverter 58201, and the signal 3rd PC directly. An input signal of the inverter 58201, that is the signal 1st PC, is outputted to the selected grade priority-corresponding processor converting circuit 583 as a first grade priority select detecting signal 1st DPC. The output signal from the AND GATE 58203 is outputted to the selected grade priority-corresponding processor converting circuit 583 as a second grade priority select detecting signal 2nd DPC. An output signal from the AND GATE 58204 is outputted to the selected grade priority-corresponding processor converting circuit 583 as a third grade priority select detecting signal 3rd DPC.

The signal 1st DPC indicates whether the first grade priority is the highest grade priority among the grade priorities which are being requested.

The signal 2nd DPC indicates whether the second grade priority is the highest grade priority among the grade priorities which are being requested.

The signal 3rd DPC indicates whether the third grade priority is the highest grade priority among the grade priorities which are being requested.

The selected grade priority-corresponding processor converting circuit 583 is used to detect which processor corresponds to the selected grade priority selected in the grade priority selecting circuit 582.

The selected grade priority-corresponding processor converting circuit 583, for example, includes nine AND GATEs 5831–5839, six inverters 5840–5845, and three OR GATEs 5846–5848 as shown in FIG. 5.

The AND GATE 5831 receives the priority information signal $P_1$ (i.e. the signals $P_{11}$ and $P_{12}$) and the signal 1st PDC. The AND GATE 5832 receives the priority information signal $P_2$ (i.e. the signals $P_{21}$ and $P_{22}$) and the signal 1st DPC. The AND GATE 5833 receives the priority information signal $P_D$ (i.e. the signals $P_{D1}$, $P_{D2}$) and the signal 1st DPC. The AND GATE 5834 receives the signal $P_{11}$ directly, the signal $P_{12}$ through the inverter 5840, and the signal 2nd DPC. The AND GATE 5835 receives the signal $P_{21}$ directly, the signal $P_{22}$ through the inverter 5841, and the signal 2nd DPC. The AND GATE 5836 receives the signal $P_{D1}$ directly, the signal $P_{D2}$ through the inverter 5842, and the signal 2nd DPC. The AND GATE 5837 receives the signal $P_{11}$ through the inverter 5843, the signal $P_{12}$ directly, and the signal 3rd DPC. The AND GATE 5838 receives the signal $P_{21}$ through the inverter 5844, the signal $P_{22}$ directly, and the signal 3rd DPC. The AND GATE 5839 receives the signal $P_{D1}$ through the inverter 5845, the signal $P_{D2}$ directly, and the signal 3rd DPC.

The OR GATE 5846 receives the output signals from the AND GATES 5831, 5834 and 5837. The OR GATE 5847 receives the output signals from the AND GATEs 5832, 5835 and 5838. The OR GATE 5848 receives the output signals from the AND GATEs 5833, 5836 and 5839.

The OR GATEs 5846–5848 respectively output processor indicating signals $DPR_1$, $DPR_2$ and $DPR_D$.

The signal $DPR_1$ indicates whether the priority corresponding to the central processing unit 51 is selected in the circuit 582. That is to say, the signal $DPR_1$ indicates whether the central processing unit 51 is selected or not.

Similarly the signal $DPR_2$ indicates whether the central processing unit 52 is selected or not, the signal $DPR_D$ indicates whether the direct memory access channel controller 53 is selected or not.

The signals $DPR_1$, $DPR_2$ and $DPR_D$ are outputted to the acknowledge signal generating circuit 584.

The acknowledge signal generating circuit 584 is used to output an acknowledge signal to one of the processors 51, 52 and 53 in accordance with the condition of the signals $DPR_1$, $DPR_2$ and $DPR_D$.

The acknowledge signal generating circuit 584, for example, includes three AND GATES 58401, 58402 and 58403, three One Shot Multivibrators 584011, 584012, 584013, and 6 inverters, as shown in FIG. 5.

The signal $DPR_1$ is inputted to the One Shot Multivibrator 584011 through the AND GATE 58401. The One Shot Multivibrator 584011 (which may be a Texas Instruments IC Serial No. 58122, Serial No. 54123, or equivalent), generates a one shot pulse for a predetermined prior when a logic level of the input signal changes from "0" to "1". This one shot pulse is utilized as an acknowledge signal $ACK_1$ which enables the first central processing unit 51 to use the common shared memory 54.

The signal $DPR_2$ is inputted to the One Shot Multivibrator 584012 through the AND GATE 58402, and the Multivibrator 584012 generates an acknowledge signal $ACK_2$ which enables the second central processing unit 52 to use the memory 54.

The signal $DPR_D$ is inputted to the One Shot Multivibrator 584013 through the AND GATE 58403, and the Multivibrator 584013 generates an acknowledge signal $ACK_D$ which enables the direct memory access channel controller 53 to use the memory.

An acknowledge signal should not be generated when another acknowledge signal is generated. Therefore the output signal of each One Shot Multivibrator is inputted to the other One Shot Multivibrators through the inverters and the AND GATEs respectively shown in FIGS. 5A–5D.

There will now be described by reference to FIG. 6 and FIG. 5 the more detailed operation of the multiprocessor system constructed as described above.

For convenience of description, let it be assumed that the priorities of the processors 51, 52 and 53 are respectively set in the flip flops 571–576 through the bus 56 at $t=t_0$. And let it be assumed that the priority of the direct memory access channel controller 53 is set to be the highest and that of the first central processing unit 51 is set to be the lowest.

(1) $t=t_0$; The contents of the flip-flops 571 and 572 corresponding to the central processing unit 51 are set to "0" and "1", respectively. The contents of the flip-flops 573 and 574 corresponding to the central processing unit 52 are set to "1" and "0", respectively. The contents of the flip-flops 575 and 576 corresponding to the direct memory access channel controller 53 are set to "1" and "1", respectively.

The contents "1" and "1" of the flip-flops represent the highest priority, that is the first grade priority. The contents "1" and "0" of those represent the second grade priority. The contents "0" and "1" of those represent the third grade priority, that is the lowest priority.

Under the above conditions, the priority information signals $P_1$, $P_2$ and $P_D$ are respectively "01", "10", and "11".

(2) $t=t_1$; Let it be assumed that the second central processing unit 52 requests the use of the common shared memory 54. The memory request signal $MRQ_2$ generated by the central processing unit 52 becomes "1", while the signals $MRQ_1$ and $MRQ_D$ are "0".

The second grade priority signal 2nd PC becomes "1", because the signal $MRQ_2$ is "1" and the priority information signal $P_2$ is "10". It should be noted that all input signals of only the AND GATE 5815 among the nine AND GATEs 5811–5819 are "1" at this time.

The second grade priority signal 2nd PC is "1" and the first grade priority signal 1st PC is "0", therefore the second grade priority select detecting signal 2nd DPC becomes "1". The grade priority select detecting signals 1st DPC and 3rd DPC remain "0".

Then the processor indicating signal $DPR_2$ becomes "1" because the signal 2nd DPC is "1" and the priority information signal $P_2$ is "10". It should be noted that all input signals of only the AND GATE 5835 among the nine AND GATEs 5831–5839 are "1". The other processor indicating signals $DPR_1$ and $DPR_D$ remain "0".

When the level of the signal $DPR_2$ changes from "0" to "1", the One Shot Multivibrator 584012 is triggered, and the Multivibrator 584012 generates a one shot pulse which stays a "1" for a predetermined period during which the second central processing unit 52 uses the memory 54. This one shot pulse is the acknowledge signal $ACK_2$ which enables the central processing unit 52 to use the memory 54.

(3) $t=t_2$; Let it be assumed that the first central processing unit 51 having the third priority requests the use of the common shared memory 54. The memory request signal $MRQ_1$ generated by the central processing unit 51 becomes "1".

Then the memory request detecting signal 3rd PC becomes "1", because all input signals of the AND GATE 5817 are "1". However, the third grade priority select detecting signal 3rd DPC does not become "1" because the second grade priority select detecting signal 2nd DPC is "1" at this time.

(4) $t=t_3$; The central processing unit 52 finishes using the memory 54. The signal $ACK_2$ and the signal $MRQ_2$ become "0". Consequently the signal 2nd PC, the signal 2nd DPC, and the signal $DPR_2$ become "0", too.

On the other hand, as the signal 3rd PC is "1", the signal 3rd DPC becomes "1".

Then the signal $DPR_1$ also becomes "1". When the level of the signal $DPR_1$ changes from "0" to "1", the One Shot Multivibrator 584011 is triggered, and the Multivibrator 584011 generates a one shot pulse which stays at "1" for a predetermined period during which the first central processing unit 51 uses the memory 54. This one shot pulse is the acknowledge signal $ACK_1$, which enables the central processing unit 51 to use the memory 54. As the result, the central processing unit 51 can use the memory.

(3) $t=t_4$; The central processing unit 51 finishes using the memory 54. Sequentially the signal $ACK_1$, the signal $MRQ_1$, the signal 3rd PC, the signal 3rd DPC, and the signal $DPR_1$ become "0".

(4) $t=t_5$; Let it be assumed that the direct memory access channel controller 53 having the first priority requests the use of the memory 54.

The memory request signal $MRQ_D$ generated by the direct memory access channel controller 53 becomes "1". Then the memory request detecting signal 1st PC becomes "1" as all input signals of the AND GATE 5813 are "1". As the result, the first grade priority select detecting signal 1st DPC and the processor indicating signal $DPR_D$ become "1".

When the level of the signal $DPR_D$ changes from "0" to "1", the One Shot Multivibrator 584013 is triggered, and the Multivibrator 584013 generates a one shot pulse which stays a "1" for a predetermined period during which the direct memory access channel controller 53 utilizes the memory 54. This one shot pulse is the acknowledge signal $ACK_D$.

(5) $t=t_6$; Let it be supposed that the central processing unit 51 having the third priority requests the use of the memory 54, and the signal $MRQ_1$ becomes "1".

The signal 3rd PC changes from "0" to "1". However, the signal 3rd DPC does not change from "0" to "1", because the signal 1st PC corresponding to the direct memory access channel controller 53 is still "1".

(6) $t=t_7$; Let it be assumed that the second central processing unit 52 having the second priority requests the use of the memory 54.

The signal $MRQ_2$ becomes "1", and the signal 2nd PC changes from "0" to "1". However, the signal 2nd DPC does not change from "0" to "1", because the signal 1st PC is "1".

(7) $t=t_8$; The direct memory access channel controller 53 finishes using the memory 54. Then the signal $ACK_D$, the signal $MRQ_D$, the 1st PC, the signal 1st DPC, and the signal $DPR_D$ become "0".

On the other hand, the signal 2nd PC and the 3rd PC are "1". Therefore the signal 2nd DPC becomes "1". However, the signal 3rd DPC still remains at "0" because the priority corresponding to the signal 2nd DPC is higher than the priority corresponding to the signal 3rd DPC.

Consequently, the signal $DPR_2$ becomes "1", and the signal $ACK_2$ also becomes "1".

Then the central processing unit 52 can use the memory 54.

(8) $t=t_9$; The central processing unit 52 finishes using the memory 54. Then the signal $ACK_2$, the signal $MRQ_2$, the signal 2nd PC, the signal 2nd DPC, and the signal $DPR_2$ become "0".

At this time, the signal 3rd PC is "1". So the signal 3rd DPC, the signal $DPR_1$, and the signal $ACK_1$ become "1". Then the first central processing unit 51 can use the memory 53.

(9) $t=t_{10}$; The central processing unit 51 finishes using the memory 54. The signal $ACK_1$, the signal $MRQ_1$, the signal 3rd PC, the signal 3rd DPC, and the signal $DPR_1$ become "0".

(10) $t=t_{20}$; Let it be assumed that the priorities of the processors 51, 52 and 53 are changed as follows. The priority of the first central processing unit 51 changes from "the third grade priority" to "the first grade priority". The priority of the second central processing unit 52 changes from "the second grade priority" to "the third grade priority". The priority of the direct memory access channel controller 53 changes from "the first grade priority" to "the second grade priority".

That is to say, the contents of the flip-flops 571-576 are changed from "011011" to "110110", for example, by programs of one of the processors 51 and 52.

Under the above conditions, the priority information signals $P_1$, $P_2$ and $P_D$ respectively become "11", "01", and "10".

(11) $t=t_{21}$; Let it be assumed that all processors 51, 52 and 53 request the use of the memory at the same time. The signals $MRQ_1$, $MRQ_2$ and $MRQ_D$ become "1". Then the signals 1st PC, 3rd PC, 2nd PC become "1".

The signal 1st PC DPC changes from "0" to "1", while the signals 2nd DPC, 3rd DPC remain "0", because the priority of the first central processing unit 51, corresponding to the signal 1st DPC, is the highest at this time.

Then the signal $DPR_1$ and the signal $ACK_1$ become "1". As the result, the central processing unit 51 can use the memory 54 first.

After the central processing unit 51 finishes using the memory 54, the direct memory access channel controller 53 having the second grade priority uses the memory 54. The second central processing unit 52 having the lowest priority cannot use the memory 54 till the direct memory access channel controller 53 finishes using the memory.

Similarly the successive operations continue, therefore the description of the following operations are omitted.

As mentioned above, this embodiment of the invention provides a multi-processor system which includes a programmable memory access priority control means having programmable register circuit, thereby being able to change the priorities of a plurality of processors.

There will now be described by reference to FIGS. 7A-7D a multi-processor system with programmable memory access priority control according to another embodiment of this invention corresponding to the multi-processor system of the FIG. 3.

The multi-processor system of FIGS. 7A-7D includes a plurality of processors 51-53, a common shared memory 54, programmable memory-access priority control means 55 and a common bus 56. The structure of this embodiment is almost the same as that of the embodiment of FIG. 5.

As apparent from FIGS. 7A-7D, a difference between the embodiment of FIGS. 5A-5D and the embodiment of FIGS. 7A-7D is that the programmable register circuit 57 used in the embodiment of FIGS. 5A-5D is replaced by programmable register circuit 570 which includes X register circuit 5710, Y register circuit 5720, and GATE circuit 5730.

The X register circuit 5710 includes six flip-flops 5711-5716. These flip-flops 5711-5716 store temporal priorities corresponding to a plurality of processors 51, 52 and 53. The flip-flops 5711-5716 output temporal priority information signals $P_{11X}$, $P_{12X}$, $P_{21X}$, $P_{22X}$, $P_{D1X}$, and $P_{D2X}$, respectively.

The X register circuit 5710 has the same structure and function as the programmable register circuit 57 of FIGS. 5A-5D. Therefore the detailed description of the X register means 5710 is omitted.

The Y register circuit 5720 is used as an inhibit register. That is, Y register circuit 5720 corresponds to the programmable mask register 323 shown in FIG. 4.

The Y register circuit 5720 stores inhibit information, which inhibits a respective designated processor from using the common shared memory 54. The inhibit information is provided and can be changed, for example, manually or by programs through one of the processors 51 and 52.

The Y register circuit 5720 has 3 flip-flops 5721-5723. When the flip-flop 5721 stores "1", a first central processing unit 51 is inhibited from using the memory 54. On the other hand, when the flip-flop 5721 stores "0", the priority of the central processing unit 51 is decided in accordance with the contents of the flip-flops 5711 and 5712. When the flip-flop 5722 stores "1", a central processing unit 52 is inhibited from using the memory 54. When the flip-flop 5722 stores "0", the priority of the central processing unit 52 is decided in accordance with the contents of the flip-flops 5713 and 5714. When the flip-flop 5723 stores "1", a direct memory access channel controller 53 is inhibited from using the memory 54. And when the flip-flop 5723 stores "0", the priority of the direct memory access channel controller 53 is decided in accordance with the contents of the flip-flops 5715 and 5716.

The flip-flops 5721, 5722 and 5723 output inhibit information signals $P_{1Y}$, $P_{2Y}$ and $P_{DY}$ respectively to the GATE circuit 5730.

The GATE circuit 5730 includes six AND GATEs 5731-5736 and six inverters 5737-5742, as shown in FIG. 7.

The AND GATE 5731 receives the signal $P_{11X}$ directly and the signal $P_{1Y}$ through the inverter 5737. This AND GATE 5731 outputs a signal $P_{11}$ to the priority control circuit 58. The AND GATE 5732 receives the signal $P_{12X}$ directly and the signal $P_{1Y}$ through the inverter 5738, and outputs a signal $P_{12}$ to the priority control circuit 58.

The AND GATE 5733 receives the signal $P_{21X}$ directly and the signal $P_{2Y}$ through the inverter 5739, and outputs a signal $P_{21}$ to the priority control circuit 58. The AND GATE 5734 receives the signal $P_{22X}$ directly and the signal $P_{2Y}$ through the inverter 5740, and outputs a signal $P_{22}$ to the priority control circuit 58.

The AND GATE 5735 receives the signal $P_{D1}$ directly and the signal $P_{DY}$ through the inverter 5741, and outputs a signal $P_{D1}$ to the priority control circuit 58. The AND GATE 5736 receives the signal $P_{D2}$ directly and the signal $P_{DY}$ through the inverter 5742, and outputs a signal $P_{D2}$ to the priority control circuit 58.

Figure 5A:
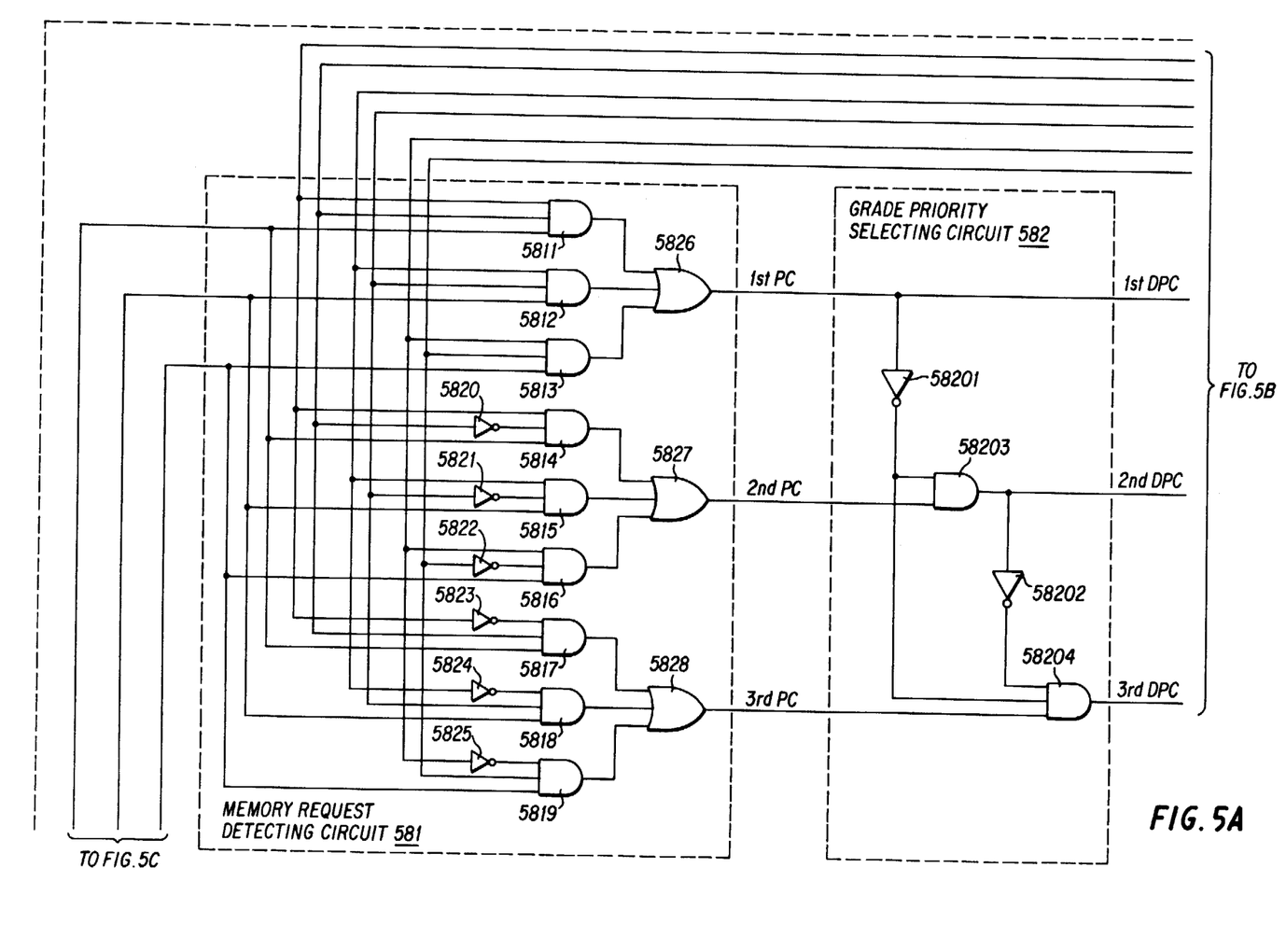
FIGS. 5A–5D constitute a circuit diagram of a multi-processor system with programmable memory access priority control according to a typical embodiment of this invention generally corresponding to the embodiment of FIG. 2.
Figure 5B:
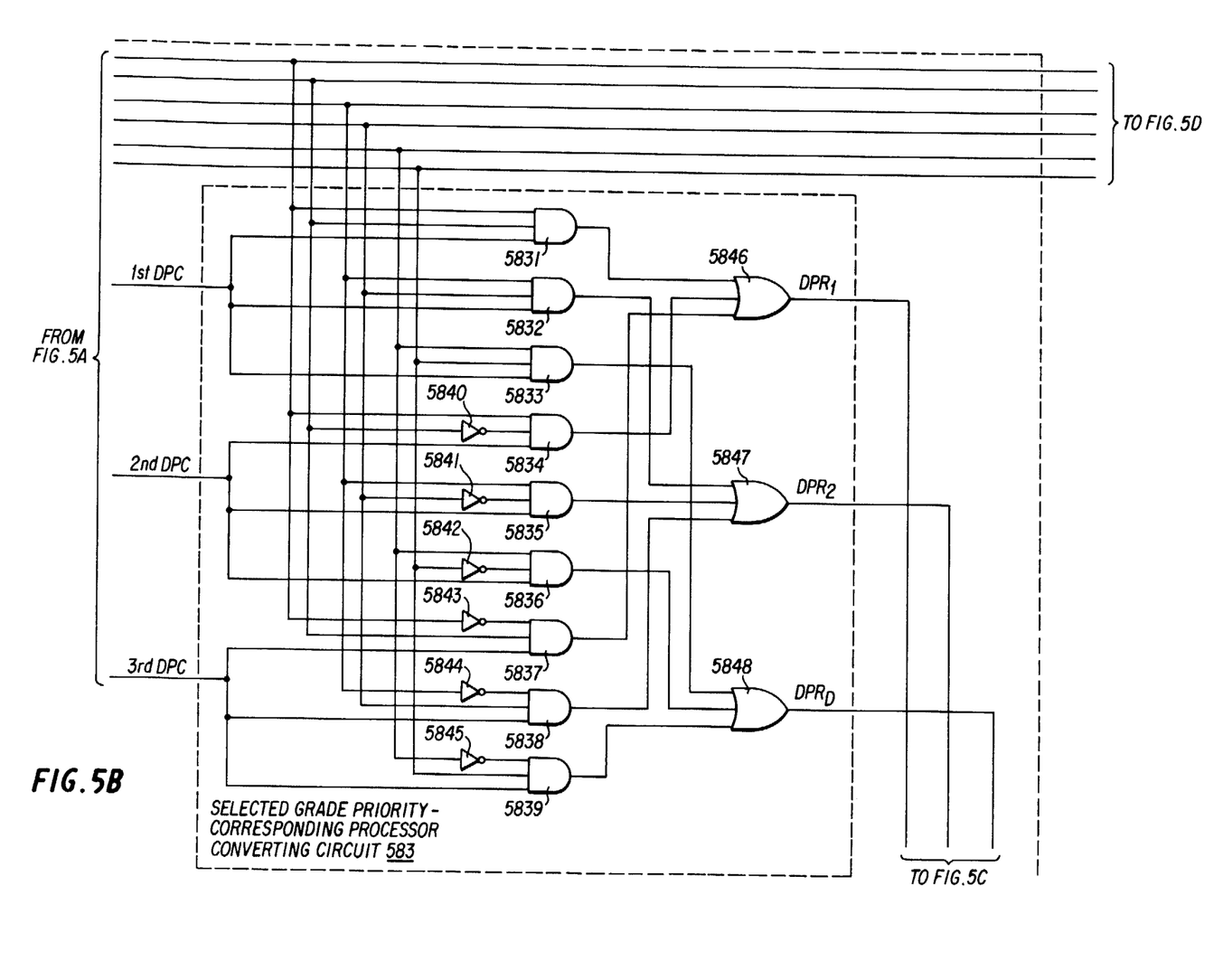
Figure 5C:
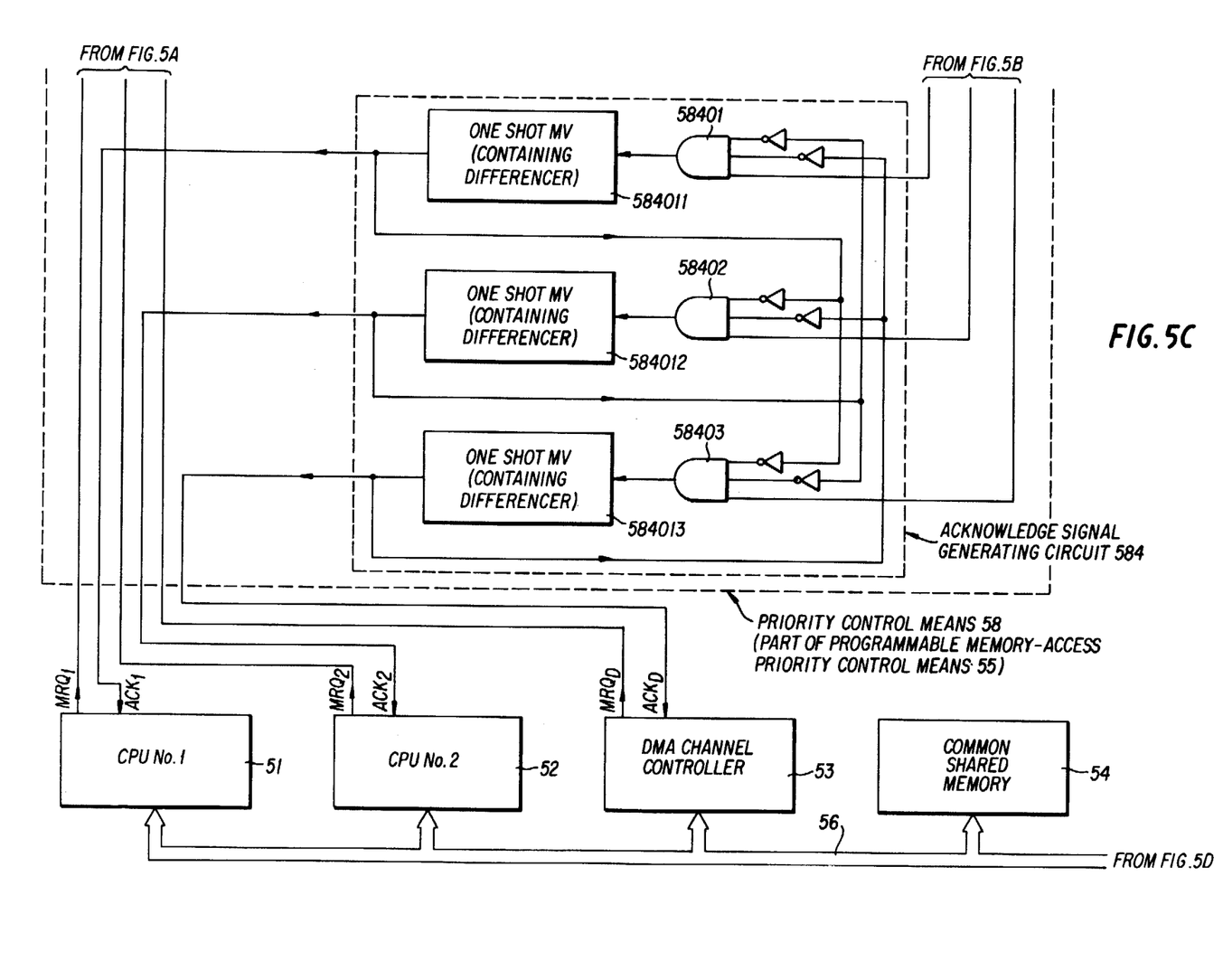
Figure 5D:
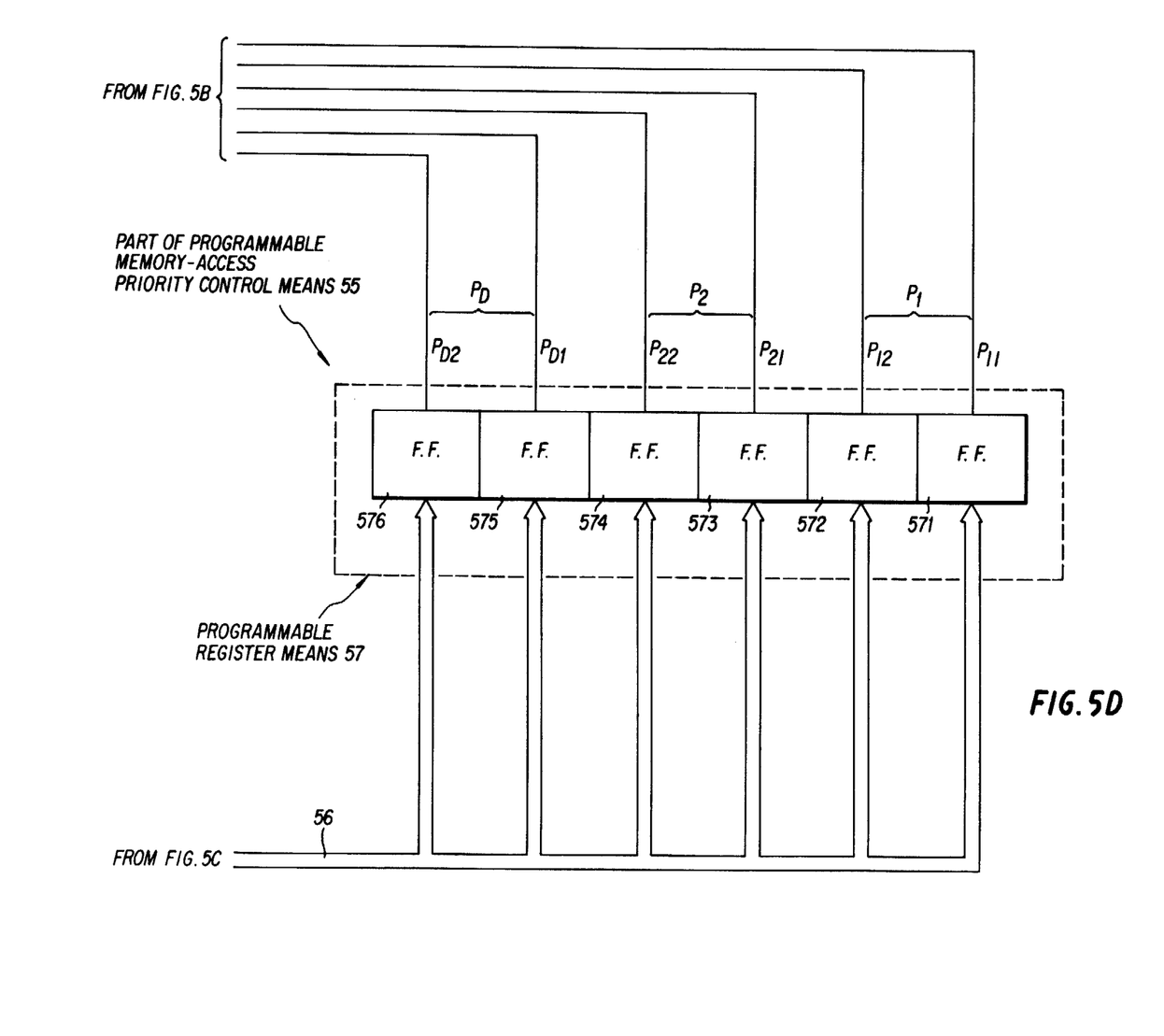
Figure 6:
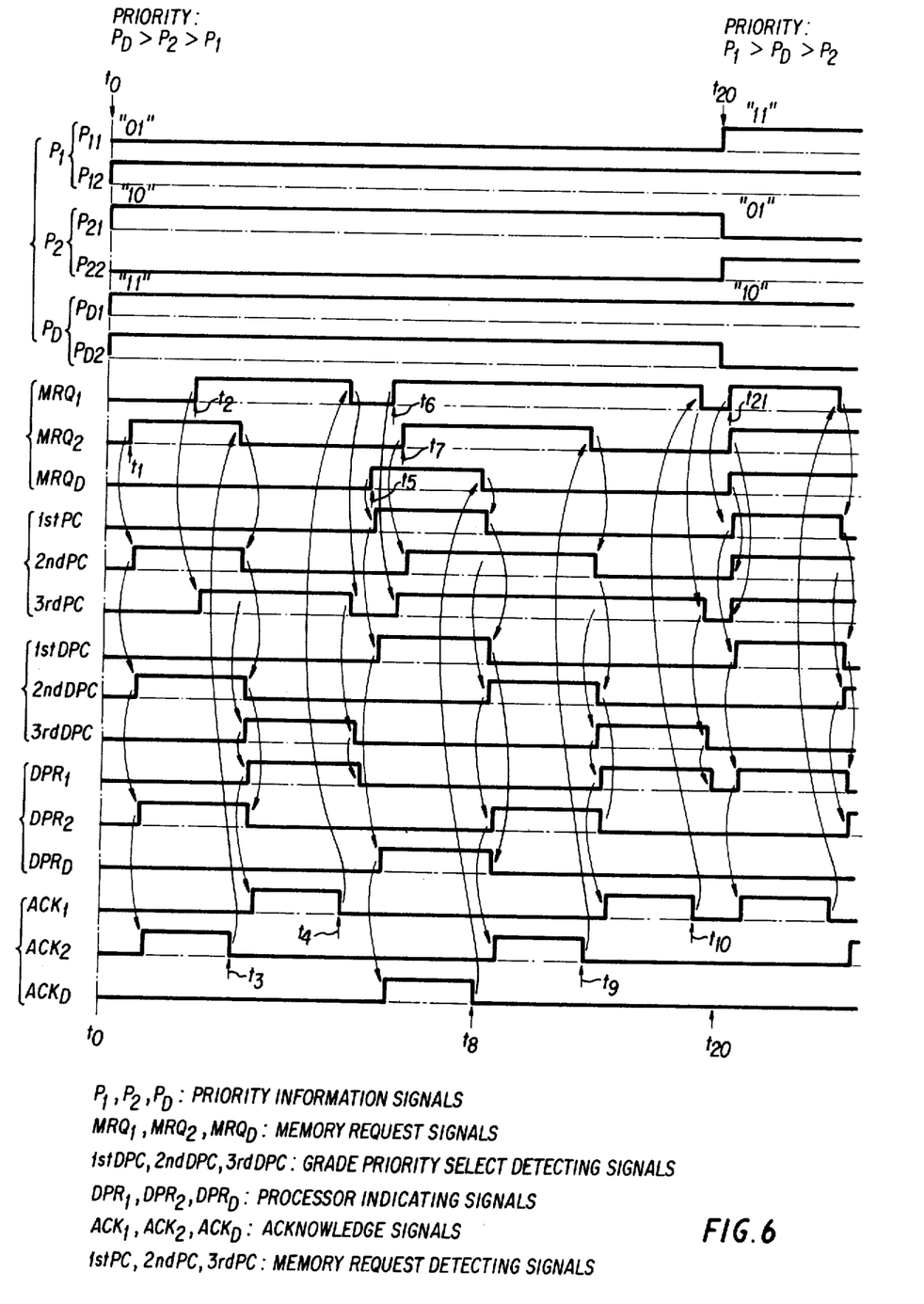
FIG. 6 is a timing diagram illustrating waveforms denoting the operation of the respective part of the multi-processor system of FIG. 5.
Figure 7A:
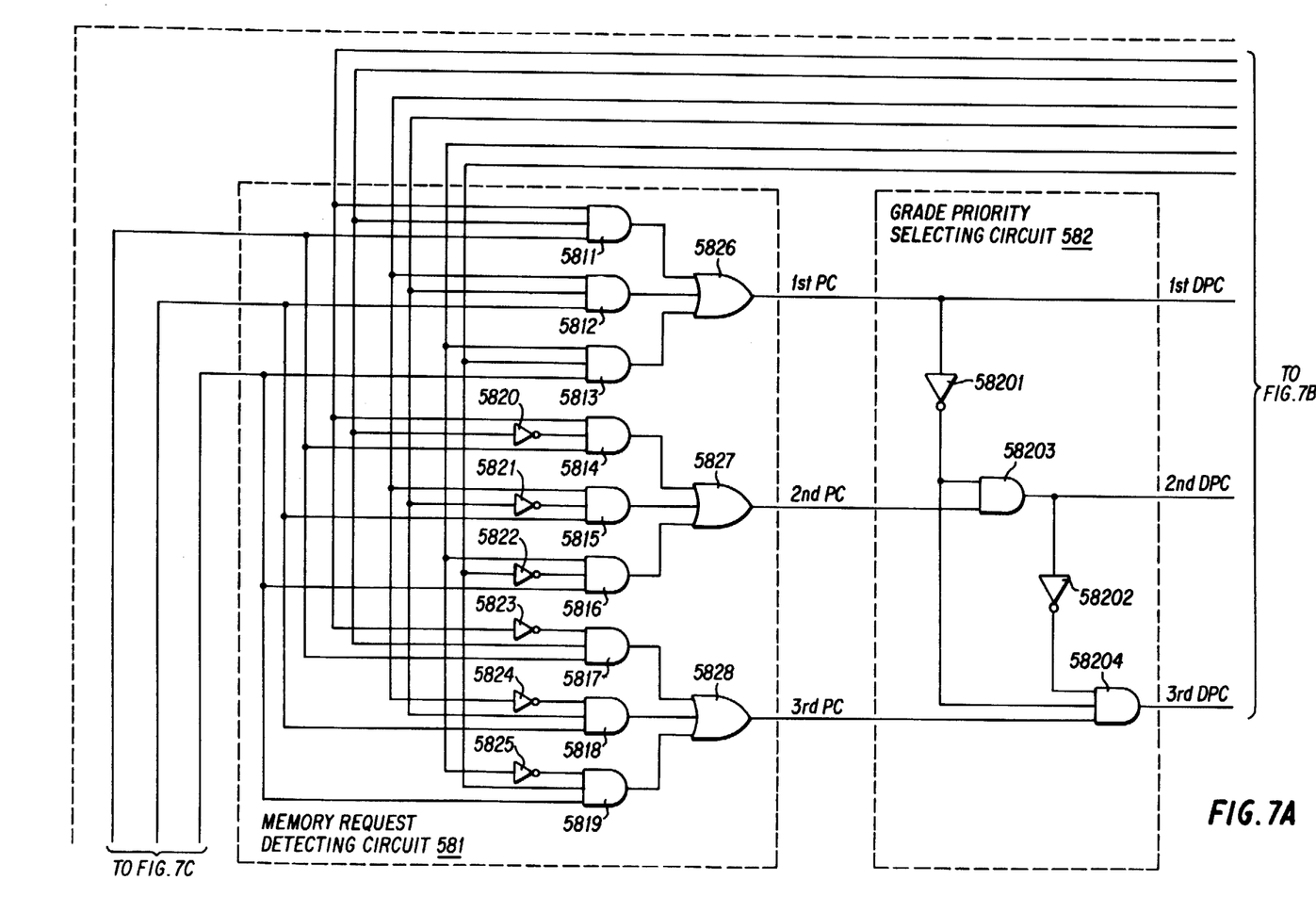
FIGS. 7A–7D constitute a circuit diagram of a multi-processor system with programmable memory access priority control means according to another embodiment of this invention corresponding generally to the embodiment of FIG. 3.
Figure 7B:
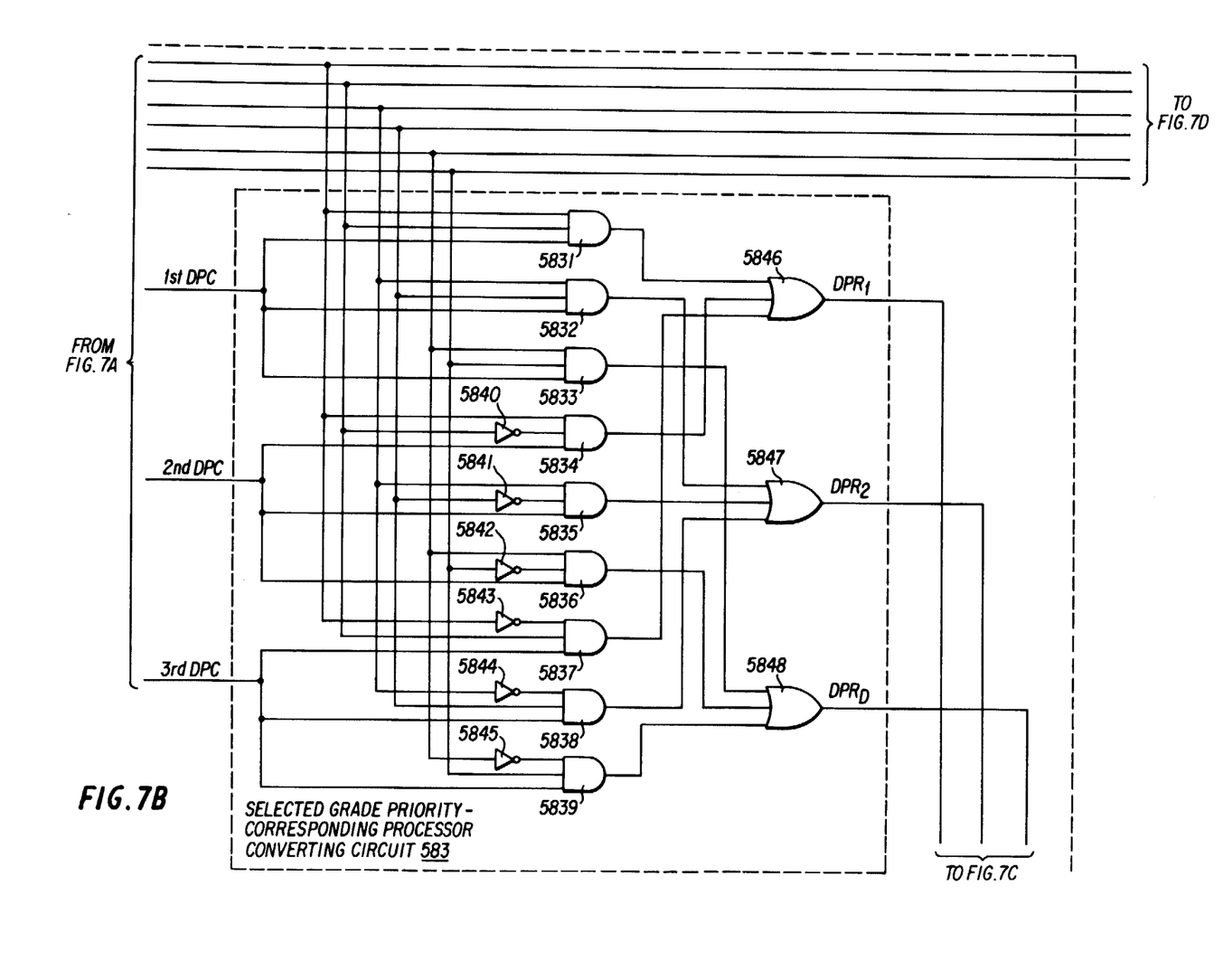
Figure 7C:
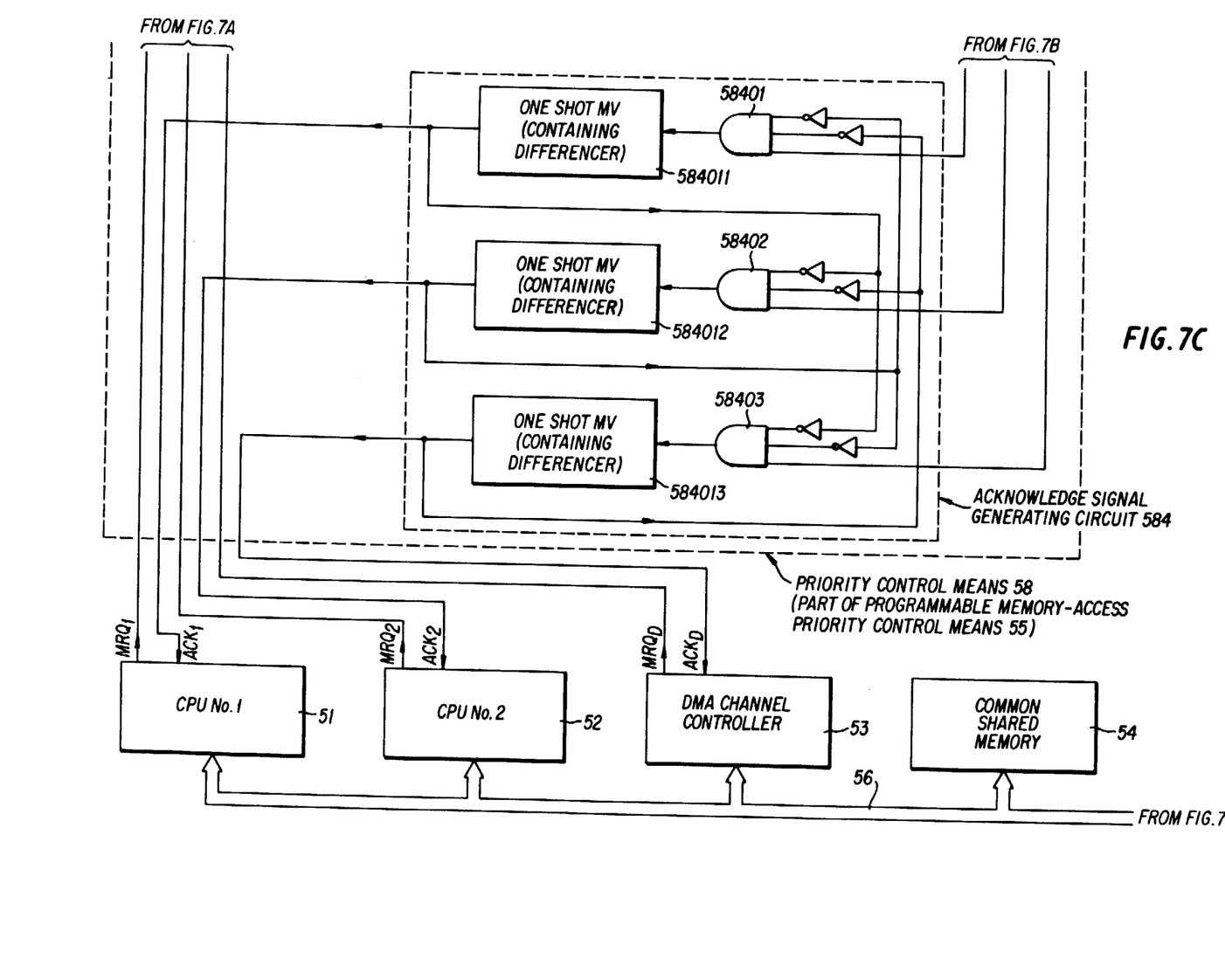
Figure 7D:
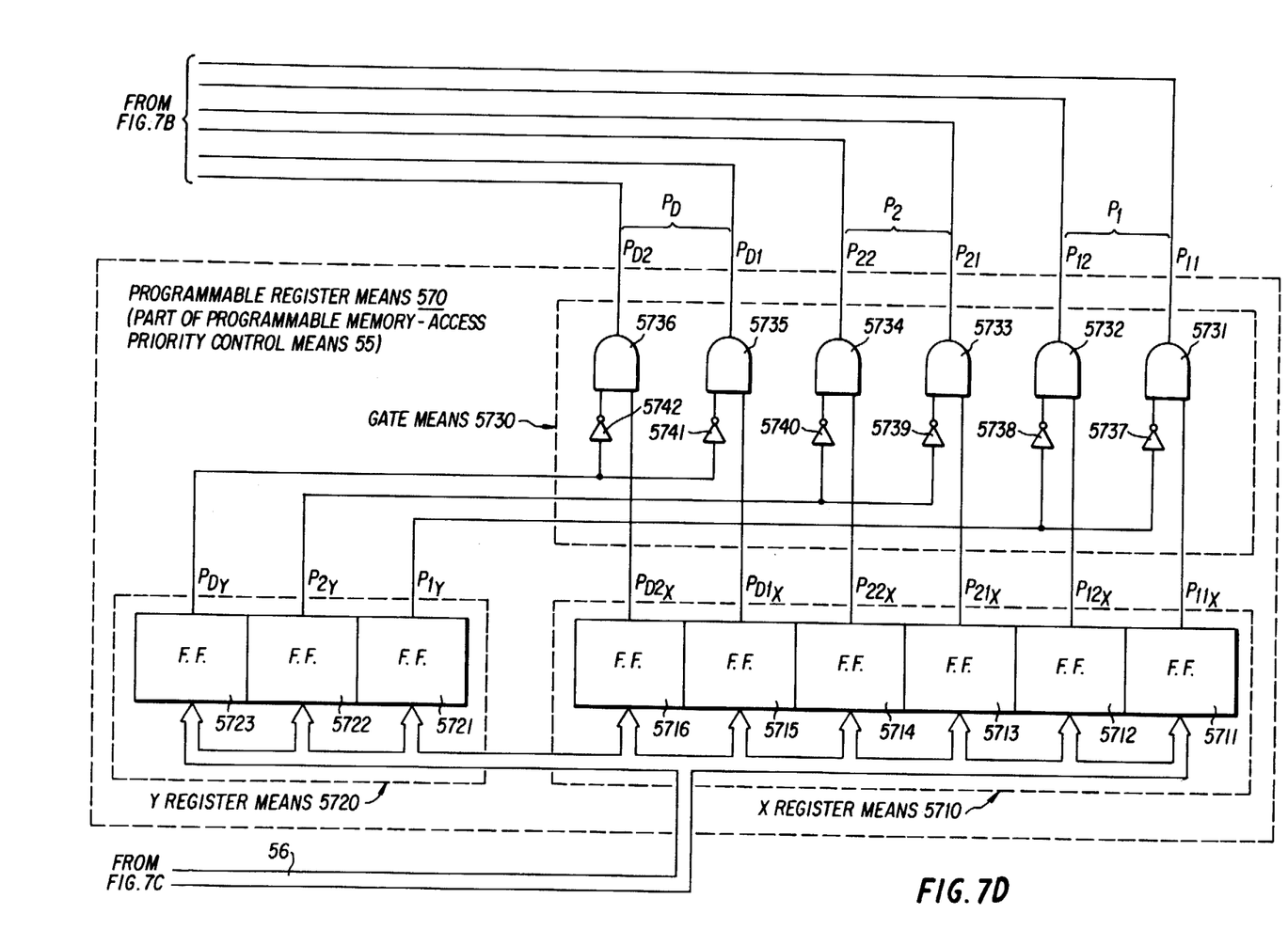

The signals $P_{11}$, $P_{12}$, $P_{21}$, $P_{22}$, $P_{D1}$ and $P_{D2}$ of FIG. 7D correspond the signals $P_{11}$, $P_{12}$, $P_{21}$, $P_{22}$, $P_{D1}$ and $P_{D2}$ of FIG. 5D, respectively.

Priority information signal $P_1$ includes the signals $P_{11}$ and $P_{12}$, priority information signal $P_2$ includes the signals $P_{21}$ and $P_{22}$, and a priority information signal $P_D$ includes the signals $P_{D1}$ and $P_{D2}$.

When the inhibit information signal is "1", the corresponding priority information signal is "0"; even if the priority (i.e. the temporary priority) of the processor corresponding to the priority information signal is decided to be the highest in the X register means 5710. Then the memory request detecting signal outputted from a memory request detecting circuit 581, the grade priority selecting detecting signal outputted from a grade priority selecting circuit 582, the processor indicating signal outputted from a selected grade priority—corresponding processor converting circuit 583, and the acknowledge signal outputted from an acknowledge signal generating circuit 584, which are influenced by the priority information signal, remain "0".

Therefore the processor cannot use the memory 54 when the corresponding inhibit information signal is "1", even if the temporary priority decided in the X register circuit 5710 is higher than that of other processors.

When the inhibit information signal is "0", the condition of the priority information signal is the same as the condition of the X register circuit 5710. Then the multi-processor system of FIGS. 7A-7D functions as the multi-processor system of FIGS. 5A-5D does.

Therefore, the embodiment of FIGS. 7A-7D provides a multi-processor system, which includes a programmable memory-access priority control function implemented by means of a programmable X register circuit and a programmable Y register circuit, thereby being able to change the priorities of a plurality of processors and being able to inhibit one of the processors from using a common shared memory.

As mentioned above, this invention provides a multi-processor system with programmable memory-access priority control means which is capable of high efficiency priority selecting of a plurality of processing means.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multi-processor system comprising:
   a plurality of processors;
   a common shared memory for use by said processors, said processors each adapted to generate a respective memory request signal to request access to said common shared memory;
   a bus connected to said processors and said memory for transferring data from said processors to said memory or from said memory to said processors;

register means for storing priority information designating a memory access grade priority for each of said processors, said priority information changeable in a predetermined manner and remaining fixed irrespective of access of said memory by any of said processors until being changed in said predetermined manner, said register means outputting priority information signals which indicate the memory access grade priority of each of said processors; and priority control means for receiving said priority information signals from said register means, for receiving said memory request signals from said processors when said processors request access of said memory, and for outputting an acknowledge signal enabling memory access to that processor requesting use of the memory and having among the processors requesting memory access the highest memory access grade priority stored in said register means;

whereby the priority of memory access of said processors is changed by changing the contents of said register means.

2. A multi-processor system according to claim 1, wherein said plurality of processors include:
a central processing unit, and
a direct memory access channel controller.

3. A multi-processor system according to claim 1, wherein said register means includes:
a flip-flop register.

4. A multi-processor system according to claim 1, wherein said register means includes:
at least one flip-flop for each of said processors.

5. A multi-processor system according to claim 1, wherein said priority control means comprises:
a memory request detecting circuit for receiving said priority information signals from said register means, for receiving said memory request signals from said processors when said processors request memory access of said memory, and for outputting memory request detecting signals which indicate whether each memory access grade priority is being requested or not;
a grade priority selecting circuit for receiving said memory request detecting signals from said memory request detecting circuit and for outputting grade priority select detecting signals which indicate the highest grade priority among said grade priorities being requested;
a selected grade priority—corresponding processor converting circuit for receiving said grade priority select detecting signals from said grade priority selecting circuit, for receiving said priority information signals from said register means, and for outputting processor indicating signals which indicate a selected processor corresponding to said highest grade priority; and
an acknowledge signal generating circuit for receiving said processor indicating signals and for outputting said acknowledge signal to said selected processor.

6. A multi-processor system comprising:
a plurality of processors;
a common shared memory for use by said processors, said processors each adapted to generate a respective memory request signal to request access to said common shared memory;
a bus connected to said processors and said memory for transferring data from said processors to said memory or from said memory to said processors;
first register means for storing first priority information designating a first memory access grade priority for each of said processors, said first priority information changeable in a predetermined manner and remaining fixed irrespective of access of said memory by any of said processors until being changed in said predetermined manners, said first register means outputting first priority information signals which indicate the first memory access grade priority of each of said processors;
second register means for storing inhibit information which can be changed, and for outputting inhibit information signals which inhibit selected ones of said processors from using the common shared memory;
gate means for receiving said first priority information signals from said first register means, for receiving said inhibit information signals from said second register means, and for outputting second priority information signals which indicate a second memory access grade priority of each of said processors with the selected ones of said processors inhibited by said second register means; and
a priority control means for receiving said second priority information signals from said gate means, for receiving said memory request signals from said processors when said processors request memory access of said memory, and for outputting an acknowledge signal enabling memory access to that processor requesting use of the memory and having among the processors requesting memory access the highest second memory access grade priority in accordance with the condition of said second priority information signals outputted by said gate means.

7. A multi-processor system according to claim 6, wherein said plurality of processors include:
a central processing unit, and
a direct memory access channel controller.

8. A multi-processor system according to claim 6, wherein said first register means includes a plurality of flip-flop registers, and said second register means includes at least one flip-flop register.

9. A multi-processor system according to claim 6, wherein said priority control means comprises:
a memory request detecting circuit for receiving said second priority information signals from said gate means, for receiving said memory request signals from said processors when said processors request memory access of said memory, and for outputting memory request detecting signals which indicate whether or not each grade priority is being requested;
a grade priority selecting circuit for receiving said memory request detecting signals from said memory request detecting circuit and for outputting grade priority select detecting signals which indicate the highest grade priority among said second grade priorities of said processors requesting memory access;
a selected grade priority—corresponding processor converting circuit for receiving said grade priority select detecting signals from said grade priority selecting circuit, for receiving said second priority information signals from said gate means, and for outputting processor indicating signals which indicate a selected processor corresponding to said highest second grade priority of said processors requesting memory access; and an acknowledge signal generating circuit for receiving said processor indicating signals, and for outputting said acknowledge signal to said processor selected by said selected grade priority corresponding processor converting circuit.

* * * * *